Oct. 25, 1966   L. W. VINTHER ETAL   3,281,160
TRAILER JACK
Filed Oct. 22, 1964

LAWRENCE W. VINTHER
DONALD L. MILLER
INVENTORS

BY

ATTORNEY

United States Patent Office 3,281,160
Patented Oct. 25, 1966

3,281,160
TRAILER JACK
Lawrence W. Vinther, 10420 Gooding Drive, Dallas, Tex., and Donald L. Miller, 321 Bedford Court E., Hurst, Tex.
Filed Oct. 22, 1964, Ser. No. 405,683
5 Claims. (Cl. 280—150)

This invention relates to a special jack as hereinafter described, two of which are intended to be placed under the rear corners of a trailer or other wheeled vehicle having a body and having springs whereby the body normally is supported on its wheels, whereby the body is additionally supported directly on the ground, independently of its wheels, to thereby provide a more steady support therefor.

One type of device which now is provided for the purpose described consists of a fixed support, two of which are rigidly connected to opposite ends of the bumper of the vehicle, as by bolts, and which may be troublesome if the driver forgets to remove the fixed supports from the vehicle and drives off with the fixed supports still in place.

An object of this invention is to provide a jack for the purpose described which is pivotally connected to the frame of the vehicle, for rotative adjustment about a transverse axis, and which when not in use is secured in a horizontally extending position, substantially parallel to the longitudinal axis of the frame, by a spring biased latch connected to the frame forwardly of the pivotal connection whereby the jack is connected thereto.

Another object of the invention is to provide a jack as described which is readily adjustable by hand to move it from an inoperative position, in which it is partly suspended from said pivotal connection, to an operative position in supporting relation to the body of the vehicle, whereby the body is additionally supported directly on the ground, independently of the wheels, and thereafter to return the jack to said inoperative position.

An advantageous feature of the invention is that no harm is done if the driver should forget to disengage the jacks before driving away, whereby the jacks are dragged by their pivotal connections behind the vehicle.

A further object of the invention is to provide a jack as described which is characterized by its simplicity, its light weight, and its comparatively small number of parts, and which may be produced inexpensively and is efficient in operation and durable in use.

The invention will be readily understood by referring to the following description and the accompanying drawing, in which.

Figure 1:
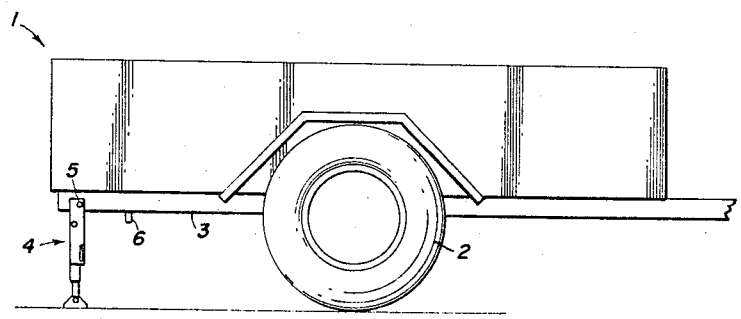
FIG. 1 is a side elevational view showing a two wheel trailer vehicle with a jack embodying the invention connected thereto, showing the jack in its operative position in supporting relation to the body of the vehicle.

Referring to the drawing, the numeral 1 designates generally a trailer vehicle having a body and having springs (not shown) whereby the body normally is supported on a pair of wheels 2, one of which is shown in FIG. 1.

The vehicle 1 has a frame including a longitudinally extending side member 3. A jack embodying the invention, indicated generally by the numeral 4, is pivotally connected at one end, as at 5, to the side member 3, rearwardly thereof, for rotative adjustment about a transverse axis.

A spring biased latch, indicated generally by the numeral 6, is connected to the side member 3 forwardly of the pivotal connection 5, and the jack 4 when not in use is secured by the latch 6 to the side member 3 and extends substantially horizontally, parallel to the longitudinal axis of the frame.

The jack 4 comprises a toggle arrangement including a first lever 7 which is connected at one end, by the pivotal connection 5, to the side member 3 as above described, and depends therefrom in one position thereof, and a second lever 8 which has one of its ends pivotally connected to the first lever 7, rearwardly thereof, as at 9, in spaced apart relation to the pivotal connection 5, and has extensible means as hereinafter described extending beyond its opposite end for frictional and pivotal engagement with the ground.

Figure 2:
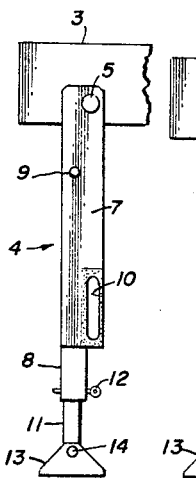
FIG. 2 is a fragmentary view on an enlarged scale, showing the jack as illustrated in FIG. 1.
Figure 3:
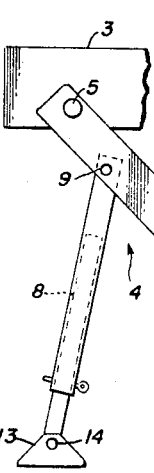
FIG. 3 is a view similar to FIG. 2 showing the jack in its inoperative position, in which it is partly suspended from the frame of the vehicle.

The first lever 7 has a handle 10 on the end thereof opposite the pivotal connection 5 whereby the first lever 7 and the second lever 8 are movable about the pivotal connection 5 and the pivotal connection 9 from an inoperative position, shown in FIG. 3, in which they are partly suspended from the side member 3, to an operative position, shown in FIG. 2, in which they are substantially aligned and extend in substantially parallel, side by side relation to each other, to thereby additionally support the body of the vehicle 1 directly on the ground, independently of the wheels 2.

The first lever 7 and the second lever 8 have mutually engaging means as hereinafter described whereby the levers 7 and 8, in the operative position thereof, shown in FIG. 2, are movable pivotally relative to each other, about the pivotal connection 9, in one direction only.

The first lever 7 is biased rotatively about the pivotal connection 9, in the operative position of the levers 7 and 8, shown in FIG. 2, by the weight of the vehicle 1, whereby the lower end of the first lever 7 is advanced rotatively in the direction of the second lever 8, to thereby prevent rotative displacement of the levers 7 and 8 relative to each other.

The first lever 7 is an elongated channel shaped member having side flanges which face rearwardly and which embrace the connected end portion of the second lever 8, including its pivotal connection 9, in the operative position of the levers 7 and 8 shown in FIG. 2, whereby the structure is reenforced.

The second lever 8 is tubular, and a bar 11, which forces a longitudinal extension thereof, is received telescopically therein and extends beyond the end thereof opposite its pivotal connection 9. The bar 11 is adjustably positioned relative to the second lever 8 by means of a pin 12 which is passed through openings therefor in opposite sides of the second lever 8 near its lower end, and which selectively engages one of a plurality of longitudinally spaced holes extending transversely through the bar 11. A foot piece 13 is pivotally connected to the lower end of the bar 11, as at 14, for frictional engagement with the ground.

Figure 4:
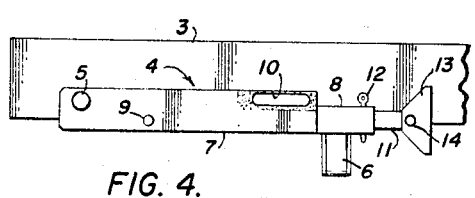
FIG. 4 shows the jack removably secured by its latch to the frame of the vehicle, as it appears when not in use.
Figure 5:
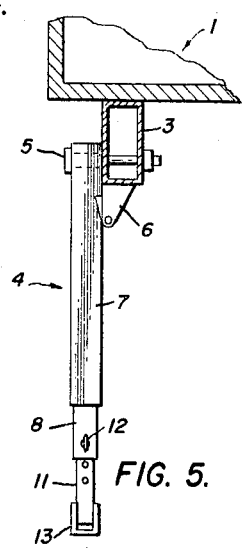
FIG. 5 is a front elevational view showing the jack as illustrated in FIG. 2.
Figure 6:
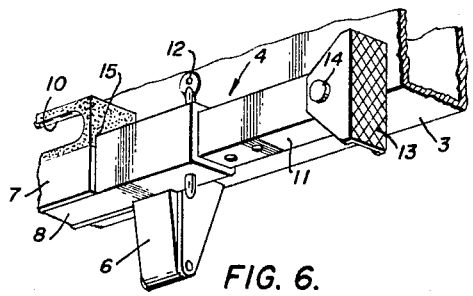
FIG. 6 is a perspective view on an enlarged scale showing a portion of the apparatus illustrated in FIG. 4, as seen from the front, bottom, and one side thereof.

The channel shaped first lever 7 has a rearwardly facing abutment 15 near its lower end, shown best in FIG. 6, for abutting engagement with the front side of the second lever 8 below its pivotal connection 9 to limit rotative movement of the first lever 7 in a clockwise direction relative to the second lever 8, about the pivotal connection 9, as illustrated in FIGS. 2, 3, and 4. Thus the jack 4 may be supported in its horizontally extending position, as illustrated in FIGS. 4 and 6, by engagement of the spring biased latch 6, which is connected to the side member 3 forwardly of the pivotal connection 5 as above described, under the end portion of the second lever 8 opposite its pivotal connection 9.

The invention may be modified in various ways without departing from the spirit and scope thereof.

We claim:

1. In combination with a wheeled vehicle having a body and having springs whereby the body normally is supported on its wheels, the combination of a jack additionally supporting the body directly on the ground, to provide a more steady support therefor, comprising a toggle arrangement including a first lever pivotally connected at one end to the body, rearwardly thereof, for rotative adjustment about a transverse axis, and a second lever having one of its ends pivotally connected to the first lever, rearwardly thereof, in spaced apart relation to said first mentioned pivotal connection, and having extensible means extending beyond the end thereof opposite said one of its ends for frictional and pivotal engagement with the ground, handle means on the end of the first lever opposite said first mentioned pivotal connection whereby the respective levers are movable about said pivotal connections from an inoperative position, in which the levers are partly suspended from the body, to an operative position in which the levers are substantially aligned and extend downwardly from the body, to thereby additionally support the body directly on the ground, and mutually engaging means on the respective levers whereby rotative adjustment of the first lever relative to the second lever, about said last mentioned pivotal connection, is limited in one direction only, the arrangement being such that the first lever is biased rotatively about said last mentioned pivotal connection, in the operative position of the levers, by the weight of the body, whereby the lower end of the first lever is advanced rotatively in the direction of the second lever, to thereby prevent rotative displacement of the levers relative to each other.

2. The structure of claim 1, and a spring biased latch on the body, forwardly of said first mentioned pivotal connection, for engagement under the jack, in supporting relation thereto, whereby the jack when not in use is adapted to be secured in a horizontally extending position, substantially parallel to the longitudinal axis of the vehicle.

3. The structure of claim 1, the first lever consisting of an elongated channel shaped member having side flanges facing rearwardly and embracing the connected end portion of the second lever, including said last mentioned pivotal connection, in the operative position of the levers, whereby the structure is reinforced.

4. The structure of claim 3, the channel shaped first lever having a rearwardly facing abutment near its lower end for abutting engagement with the front side of the second lever below said last mentitoned pivotal connection to limit rotative adjustment of the first lever in one direction relative to the second lever, about said last mentioned pivotal connection.

5. The structure of claim 4, the second lever being tubular and having a bar, forming a longitudinal extension thereof, received telescopically therein and extending beyond the end thereof opposite said last mentioned pivotal connection, the bar having means removably and adjustably connecting it to the second lever for longitudinal adjustment relative thereto, and having a foot piece pivotally connected to its lower end for frictional engagement with the ground.

References Cited by the Examiner
UNITED STATES PATENTS

| | | | |
|---|---|---|---|
| 1,204,162 | 11/1916 | Kirstaetter | 254—86 |
| 1,668,140 | 5/1928 | Buchheit | 248—351 X |
| 2,207,640 | 7/1940 | Short | 254—86 |
| 2,580,545 | 1/1952 | Hill | 280—475 |

BENJAMIN HERSH, *Primary Examiner.*

W. A. MARCONTELL, *Assistant Examiner.*